United States Patent Office 3,833,536
Patented Sept. 3, 1974

3,833,536
BULK DYEING OF THERMOPLASTICS
Werner Steinbeck, Cologne, and Hans-Samuel Bien, Burscheid, Germany, assignors to Bayer Aktiengesellschaft, Leverkusen, Germany
No Drawing. Filed Sept. 29, 1972, Ser. No. 293,557
Claims priority, application Germany, Sept. 30, 1971, P 21 48 850.6
Int. Cl. C08g 51/04
U.S. Cl. 260—40 P                     5 Claims

ABSTRACT OF THE DISCLOSURE 8,8'-dihydroxy-naphthazine of the formula

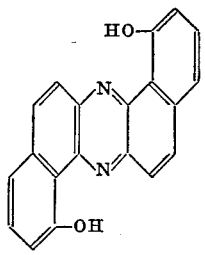

is suitable for the bulk dyeing of plastics, such as polycarbonates, polyamides. polymethacrylates, polystyrene, polyesters, polyolefines, polyvinylchloride and mixed polymerisates, e.g. from acrylonitrile, butadiene and styrene.

Dyestuffs for dyeing plastics in bulk must possess a number of properties specific to this end use, for example heat resistance, fastness to weathering and to light, and good dispersibility and/or solubility in the plastic. As new plastics have been developed, the requirements regarding the heat stability of such dyestuffs, in particular, have risen. This applies, for example, to the case of dyeing plastics consisting of polycarbonates, for which, in practice, the dyestuffs have to be heat resistant up to 300° C.

When dyeing polystyrene, polymethacrylates and polyamides in bulk, the dyestuffs are again required to be heat resistant up to at least 250° C. In injection moulding practice, however, temperatures of up to 300° C. here again frequently occur, for example in the injection cylinder.

Most organic dyestuffs for which attempts to use them in this field have hitherto been made are only heat-resistant up to 180–220° C.

Dyestuffs which conform to such increased requirements are generally only known from the series of the inorganic pigments, for example ultramarine, iron oxides, titanium dioxide and some others. However, only opaque shades can be achieved with these compounds. For transparent dyeings, only isolated organic dyestuffs from the series of the anthraquinone dyestuffs, the perinones and the quinophthalones are available.

It has now been found that 8,8'-dihydroxy-naphthazine of the formula

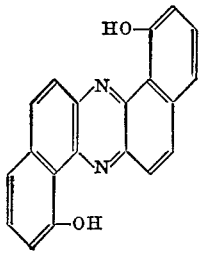

is suitable for the bulk dyeing of plastics, such as polycarbonates, polyamides, polymethacrylates, polystyrene, polyesters, polyolefines, polyvinylchlorid and mixed polymerisates, e.g. from acrylonitrile, butadiene and styrene.

By bulk dyeing there is here understood the addition of dyestuffs especially before and after polymerisation. In addition to high colour strength and excellent fastness to light, 8,8'-dihydroxy-naphthazine possesses excellent heat resistance in the plastics mentioned, even up to 300° C. Transparent, reddish-tinged yellow dyeings are obtained. Corresponding opaque dyeings can also be obtained by addition of inorganic pigments which are insoluble in plastics, such as, for example, titanium dioxide.

8,8'-Dihydroxy-naphthazine is employed in a finely divided form and in general no dispersing agents are used conjointly. The dyestuff is either already obtained in a finely divided form during manufacture or is converted into such a form by known, suitable processes such as by grinding in a dry or moist form, optionally together with organic solvents, or by kneading or grinding the crude product in the presence of solid grinding auxiliaries, such as sodium sulphate, sodium chloride or other salts which can be eluted after the grinding process. According to another method, the dyestuff is obtained in a finely divided form by first dissolving the crude product in sulphuric acid, and reprecipitating it.

The dyestuff is mixed or ground dry with the plastics granules and this mixture is plasticised and homogenised, for example on mixing mills or in screws. The dyestuff can also be added to the molten mass and the latter homogeneously distributed by stirring. The material predyed in this way is then further processed in the usual manner, for example by spinning to give bristles, filaments and the like, or by extrusion or by the injection moulding process to give mouldings.

8,8'-Dihydroxy-naphthazine is resistant to polymerisation catalysts, such as, for example, benzoyl peroxide. It is therefore also possible to add the dyestuff to the monomeric starting materials for the plastics and then to carry out the polymerisation in the presence of polymerisation catalysts. For this it is necessary to dissolve the dyestuff in the monomeric components or to mix it intimately with the latter.

The known thermoplastic polymerisation products of methacrylic acid esters, of which the alcohol radical is preferably derived from low molecular alcohols, such as methanol or ethanol, are used as polymethacrylates. They are obtained according to known processes from monomeric methacrylic acid esters in the presence of catalysts, such as benzoyl peroxide. Suspension or bead polymerisation, emulsion polymerisation and block polymerisation are of particular industrial importance.

High molecular thermoplastic polycarbonates which are suitable according to the invention can be manufactured, for example, by reaction of aromatic dihydroxy compounds, such as hydroquinone or resorcinol, di-(monohydroxyaryl)-alkanes being particularly suitable, which are present alone or mixed with aliphatic or cycloaliphatic dihydroxy compounds, with aliphatic or cycloaliphatic diesters of carbonic acid or with phosgene, or by reaction of bis-chlorocarbonic acid esters of aromatic dihydroxy compounds with aromatic, aliphatic or cycloaliphatic dihydroxy compounds, for example according to the processes according to British Patent Specifications Nos. 772,627, 808,485 and 808,487 (compare also Ang. Chem., 68 [1956], 633–640).

Polycarbonates which are particularly suitable according to the invention are manufactured from the following di-(monohydroxyaryl)-alkanes:

4,4'-dihydroxy-diphenyl-methane,
4,4'-dihydroxy-diphenyl-dimethyl-methane, 4,4'-dihydroxy-diphenyl-1,1-cyclohexane,
4,4'-dihydroxy-3,3'-dimethyl-diphenyl-1,1-cyclohexane,
2,2'-dihydroxy-4,4'-tert.-butyl-diphenyl-dimethyl-methane,
2,2-(4,4'-dihydroxy-diphenyl)-pentane,
3,3-(4,4'-dihydroxy-diphenyl)pentane,
2,2-(4,4'-dihydroxy-diphenyl)-3-methyl-butane,
2,2-(4,4'-dihydroxy-diphenyl)-hexane,
2,2-(4,4'-dihydroxy-diphenyl)-heptane,
4,4-(4,4'-dihydroxy-diphenyl)-heptane,
2,2-(4,4'-dihydroxy-diphenyl)-dodecane,
2,2-(4,4'-dihydroxy-diphenyl)-4-methyl-pentane, and
2,2-(4,4'-dihydroxy-diphenyl)-butane.

The high molecular polycarbonates from 4,4'-di-(monohydroxyaryl)-alkanes correspond to the formula

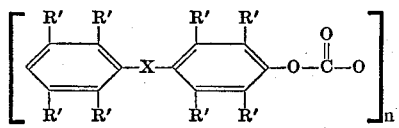

wherein
X represents the groups

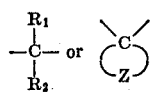

wherein $R_1$ and $R_2$ represent hydrogen atoms or monovalent hydrocarbon radicals with up to 10 C. atoms, monovalent cycloaliphatic radicals, monovalent aralkyl radicals, phenyl radicals and furyl radicals,
Z denotes the remaining members required to form the cycloaliphatic ring,
R' denotes hydrogen, monovalent, straight-chain or branched aliphatic hydrocarbon radicals with up to 5 carbon atoms or monovalent cycloaliphatic or aromatic hydrocarbon radicals, and
$n$ denotes an integer $>20$, preferably $>50$.

The processes of British Patent Specifications 808,488, 808,489 and 808,490 can be utilised for the manufacture of such polycarbonates.

Further high molecular polycarbonates which are suitable according to the invention can be obtained by reaction of dihydroxy-diaryl-sulphones or mixtures of dihydroxydiaryl-sulphones with other bifunctional dihydroxy compounds according to the process of British Patent Specification 808,486 or from dihydroxy-diaryl-ethers or dihydroxy-diaryl-thioethers or from mixtures of these components with other dihydroxy components according to British Patent Specification 809,735. Such polycarbonates can be obtained, for example, on using the following dihydroxy compounds:

4,4'-dihydroxy-diphenyl-sulphone,
2,2'-dihydroxy-diphenyl-sulphone,
3,3'-dihydroxy-diphenyl-sulphone,
4,4'-dihydroxy-2,2'-dimethyl-diphenyl-sulphone,
4,4'-dihydroxy-3,3'-dimethyl-diphenyl-sulphone,
2,2'-dihydroxy-4,4'-dimethyl-diphenyl-sulphone,
2,2'-dihydroxy-1,1'-dinaphthyl-sulphone,
4,4'-dihydroxy-diphenyl-ether,
4,4'-dihydroxy-2,2'-dimethyl-diphenyl-ether,
4,4'-dihydroxy-3,3'-dimethyl-diphenyl-ether and their homologues,
4,4'-dihydroxy-diphenyl-sulphide,
4,4'-dihydroxy-3,3'-dimethyl-diphenylsulphide
and their homologues.

Possible polyamides are above all the known products, commercially available under the designations polyamide 6, polyamide 6,6 and polyamide 12.

8,8'-Dihydroxy-naphthazine is used in amounts of 0.0005% to 1%, preferably 0.01–0.5%, relative to the amount of plastic, for dyeing the plastics mentioned.

Titanium dioxide can be used in an amount of 0.1%–2%. The plastics dyed according to the process of the invention are distinguished by a reddish-tinged yellow colour shade of excellent fastness to lght and fastness to weathering.

In the examples which follow the parts denote parts by weight unless otherwise stated.

EXAMPLE 1

(a) 0.05 part of 8,8'-dihydroxy-naphthazine are introduced at 300° C. into 100 parts of molten polycarbonate from 2,2 - (4,4' - dihydroxy-diphenyl)-propane and phosgene, having a K-value of about 50, and are homogeneously distributed with constant stirring. A transparent reddish-tinged yellow dyeing of very good fastness to light is obtained. The dyed polycarbonate is expelled from the stirred kettle as a ribbon or tape and is converted into granules. The granules can be converted into filaments, bristles, films, sheets, pipes or other profiles in accordance with the customary methods for the processing of thermoplastic compositions such as, for example, by the extruder process.

(b) If the procedure described above is followed, but with addition of 1% of titanium dioxide, an opaque colouration in an attractive shade of yellow is obtained.

EXAMPLE 2

100 parts of polymethyl methacrylate and 0.05 parts of 8,8'-dihydrox-naphthazine are mixed dry and homogenised in a twin-screw extruder. The material issuing from the nozzle of the extruder is granulated and can then be pressed into shapes in the usual manner. A plastic of transparent colour is obtained.

EXAMPLE 3

(a) 0.05 parts of 8,8'-dihydroxy-naphthazine are added to 100 parts of polystyrene in the form of granules and the mixture is homogenised on a heated mill at 160° C. The mixture in the form of a rough sheet is crushed and the corresponding granules are further processed by the injection moulding process to give plastics particles, thereby giving plastics of a transparent yellow colour of very good fastness to light.

(b) If additionally 0.5 parts of titanium dioxide are added an attractive opaque colouration is obtained.

EXAMPLE 4

0.02 parts of 8,8'-dihydroxy-naphthazine are dissolved in 100 parts of monomeric methyl methacrylate. After adding 0.2 parts of benzoyl peroxide the mass is polymerised at 70–80° C. A transparent reddish-tinged yellow block polymer is obtained.

EXAMPLE 5

100 parts of polyamide 6 chips, obtained by polymerisation of ε-caprolactam, are intimately mixed with 0.05 parts of 8,8'-dihydroxy-naphthazine in a shaking machine. The powder-coated chips thus obtained are fused in an extruder at 260° C., the resulting melt is forced through a single-hole die of 0.5 mm. diameter and the filament which issues is drawn off at a speed of approx. 25 m./minute. The filament can be stretched four-fold in hot water. A transparent filament, dyed brilliant yellow, of excellent fastness to light is obtained. If it is desired to obtain an opaque colouration, 0.5 parts of titanium dioxide are additionally introduced.

The dwell time in the extruder can be up to 30 minutes without impairing the colour shade.

EXAMPLE 6

100 parts of a mixed polymerisate of acrylonitrile, butadiene and styrene, 1 part of titanium dioxide and 0.05 parts 8,8' - dihydroxy-naphthazine are intimately mixed and subsequently processed with an injection moulding apparatus provided with a screw at 230 to 260° C. to give an opaque yellow shape.

EXAMPLE 7

100 parts of a polyvinyl chlorid powder and 0.01 parts 8,8'-dihydroxy-naphthazine are homogenized on a heated mill at 150 to 170° C. The obtained sheet is crushed and the corresponding transparent yellow granules can be pressed into shapes in the usual manner.

What is claimed is:
1. Use of 8,8'-dihydroxy-naphthazine of the formula

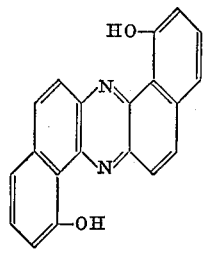

for the bulk dyeing of thermoplastics.

2. Use of 8,8'-dihydroxy-naphthazine of Claim 1 for the bulk dyeing of polycarbonates, polyamides, polymethacrylates, polystyrene, polyesters, polyolefines, polyvinyl- chloride and mixed polymerisates, e.g. from acrylonitrile, butadiene and styrene.

3. Use of 8,8'-dihydroxy-naphthazine according to Claim 2, characterised in that 0.0005% to 1%, relative to plastic, is employed.

4. Use of 0.1% to 2% of titanium dioxide in addition to the 8,8'-dihydroxy-naphthazine according to Claim 3.

5. Plastics dyed with 8,8'-dihydroxy-naphthazine according to Claim 4.

References Cited

UNITED STATES PATENTS

| 1,818,037 | 8/1931 | Bruck et al. | 260—266 |
| 3,211,694 | 10/1965 | Altermatt | 260—41 C |

OTHER REFERENCES

J. E. Simpson: "Colorants for Plastics," *Modern Plastics Encyclopedia, 1967*, vol. 44, No. 1A pp. 458-61.

ALLAN LIEBERMAN, Primary Examiner

S. M. PERSON, Assistant Examiner

U.S. Cl. X.R.

260—37 P, PC, NP, 41 C, 41.5 R, 266